Aug. 21, 1962  J. E. BRELSFORD  3,050,176
CONVEYOR
Filed March 16, 1960
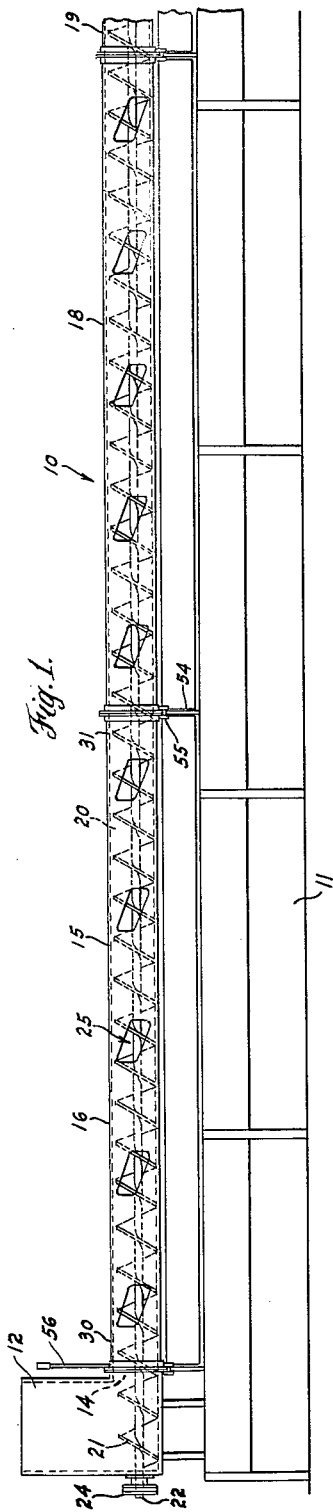
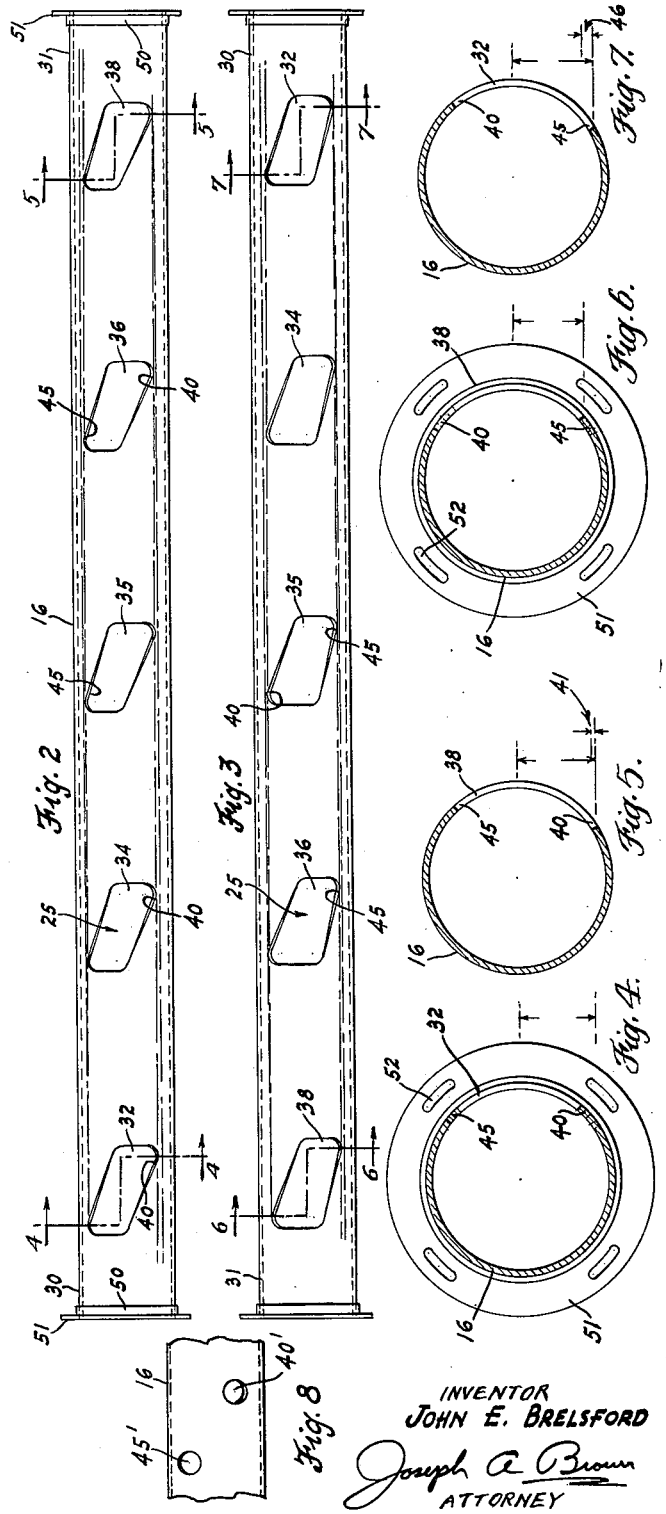
INVENTOR
JOHN E. BRELSFORD
Joseph A. Brown
ATTORNEY

United States Patent Office 3,050,176
Patented Aug. 21, 1962

3,050,176
CONVEYOR
John E. Brelsford, Terre Hill, Pa., assignor to Sperry Rand Corporation, New Holland, Pa., a corporation of Delaware
Filed Mar. 16, 1960, Ser. No. 15,345
9 Claims. (Cl. 198—64)

This invention relates to apparatus for conveying forage or the like. More particularly, the invention relates to an improvement in conveyors of the type shown and described in U.S. Patent No. 2,867,314 issued January 6, 1959.

The structure shown in such patent comprises a hopper adapted to receive a supply of forage, shelled corn, food supplements or the like. The hopper has an outlet opening. Communicating with the opening is a conveyor comprising a tube in which an auger is rotatable. The auger withdraws material from the hopper and conveys it through the tube and away from the hopper. The tube has a plurality of longitudinally spaced holes. Each hole has a lower wall and these walls are disposed progressively lower from a high point adjacent the hopper to a low point at the remote end of the tube. The progressively lower positioning of each hole enables the distribution of material evenly along the length of the conveyor. The amount of material discharged from one hole will be substantially the same as the amount of material discharged from any other hole.

The apparatus shown in Patent No. 2,867,314 is primarily adapted to be used in feeding animals. The overall length of the conveying structure is determined by the needs of the user. Generally, the feeder is sold in fifty, one hundred or one hundred and fifty foot lengths. For optimum and uniform discharge of material along the lengths of such conveyors, it is necessary that the progressively lower positioning of each hole from a prior hole be established according to the overall length of the tube. For example, it has been found that if the overall length of the conveyor is to be fifty feet, it is desirable to have holes which are displaced about 1/8" from each other. In an installation one hundred feet long, it is desirable to have holes which are displaced about 1/16" relative to each other. For an installation one hundred and fifty feet long a hole displacement around 1/32" is desirable. In other words, the longer the tube, the less the hole displacement.

Heretofore, conveyors of this type have been manufactured wherein three tube sizes are provided. All of the tubes have the same diameter. However, the angular displacement of the holes in any given size of tube will differ from the angular displacement of the holes in another size tube. Specifically, it has been the practice to manufacture tubes having 1/8, 1/16 and 1/32 hole displacement. Manufacturing three different tube sizes requires three separate manufacturing arrangements. Further, the dealer who handles the equipment must stock three tube sizes. Therefore, manufacturing and sale problems are three times greater than if a single tube size was employed.

Moreover, if a farmer installs a fifty foot conveyor system having tubes with 1/8" hole spacing and later wishes to increase his installation to one hundred and fifty feet, it is necessary that he replace the tubes which he has in use with tubes which have a 1/32" hole spacing if optimum operating characteristics are to be obtained. In like respect if a farmer has a hundred and fifty foot installation and wishes to remove one hundred feet, it is necessary that he change the tube size on the fifty foot section retained from a 1/32" hole spacing to a 1/8" hole spacing. Therefore, the ultimate user of the equipment is in likewise subjected to problems.

One object of this invention is to provide a conveyor of the character described which requires only one tube size for various length installations.

Another object of this invention is to provide a simplified tube construction for a conveyor of the character described which minimizes manufacturing, sales and use problems.

Another object of this invention is to provide a conveyor of the character described having discharge openings each of which provides two discharge rates depending on whether the tube is mounted upside down or rightside up.

A further object of this invention is to provide a conveyor of the character described having tube openings of unique configuration whereby they are relatively easy to manufacture and nevertheless produce desired operating characteristics.

Other objects of this invention will be apparent hereinafter from the specification and from the recital in the appended claims.

In the drawings:

FIG. 1 is a side elevation of a conveyor constructed according to this invention;

FIG. 2 is a side elevation, on an enlarged scale, showing one tube section of the conveyor rightside up;

FIG. 3 is a view similar to FIG. 2 showing the tube section upside down;

FIGS. 4 and 5 are sections taken on the lines 4—4 and 5—5, respectively, of FIG. 2 looking in the direction of the arrows;

FIGS. 6 and 7 are sections taken on the lines 6—6 and 7—7, respectively, of FIG. 3 looking in the direction of the arrows; and FIG. 8 is a fragmentary section of a tube showing the use of two, separate discharge openings.

Referring now to the drawings by numerals of reference and first to FIG. 1, 10 denotes generally forage conveying apparatus which comprises a support frame 11 having a hopper or supply source 12 mounted on one end thereof. The hopper has a bottom, lateral discharge opening 14 which communicates with a tube 15. Tube 15 comprises a plurality of tube sections each of which may be of any suitable length, such as ten feet long. In FIG. 1 two full tube sections are shown, namely sections 16 and 18, and part of a section 19. Extending through the tube sections is an auger 20 having one end 21 disposed within the bottom of the hopper 12. Auger 20 has a shaft 22 which extends externally of the hopper 12 and has a drive pulley 24 mounted thereon. Pulley 24 may be connected to any suitable source of power to rotate the auger. When viewed as shown in FIG. 1, auger 20 rotates in such direction that forage or other material dumped into the hopper 12 is conveyed from left to right through the tube 15 and the sections 16, 18 and 19.

In order to secure the even delivery of forage or other material along the length of the conveyor, the structure is provided with lateral discharge openings 25 which are longitudinally spaced relative to each other. The successive openings in the tube are all of identical configuration. However, they are angularly displaced relative to each other as described in Patent No. 2,867,-314 to produce a uniform discharge along the length of the tube. Each tube section is of identical construction and is fabricated as shown in detail in FIGS. 2-7. Since all the tube sections are of the same construction, only the structure of tube section 16 will be described.

Tube section 16 has a first end 30 adjacent the hopper 12 and a second end 31 more remote therefrom. The openings 25 are positioned between these ends, there being five openings shown. It will be understood that there could be a greater or lesser number of openings as desired. The openings are denoted 32, 34, 35, 36 and 38 from the end 30 toward end 31. Each of these openings has a lower wall portion 40, there being an angular displacement of each successive lower wall from the end 30 of tube section 16 toward the end 31. Thus, the opening 34 has a wall portion 40 slightly below the wall portion 40 of the opening 32. Likewise, the wall portion 40 of the opening 35 is below the wall portion 40 of the opening 34. This same displacement applies to the holes 36 and 38. Preferably, although not necessary, angular displacement of the lower wall portions of the holes is about 1/64". Therefore, the wall portion 40 of the opening 38 is 1/16" below the wall portion 40 of the opening 32. This increment of drop is clearly shown in FIGS. 4 and 5. FIG. 4 shows the opening 32 wherein its lower wall portion 40 is position as shown. The last opening 38, FIG. 5, has a lower wall portion 40 which is lower than the lower wall portion of the opening 32. The total angular displacement of the openings in tube section 16 is indicated by the space 41 in FIG. 5.

In addition to the lower wall portions 40 of each hole, each hole has a higher wall portion 45. Each higher wall portion 45 of the successive holes is progressively angularly displaced relative to the previous hole or holes. The wall portion 45 of the hole 34 is below the wall portion 45 of the hole 32. The wall portion 45 of hole 35 is below the wall portion 45 of hole 34, and so on along the tube. However, the progressive angular displacement of the wall portions 45 from the end 30 to the end 31 of tube section 16 is different than the displacement provided for the lower wall portions 40. Specifically, each successive hole has a higher wall portion 45 which is displaced about 3/64". Such displacement is also shown in FIGS. 4 and 5.

When the conveyor is arranged with each tube section mounted as shown in FIG. 2 with the end 30 connected to the hopper 12 and the end 31 remote therefrom, material conveyed through the tube is discharged laterally over the lower wall portions 40 of the tube openings 25. Since the progressive increment of drop of the successive holes is 1/64", an installation in the range of about one hundred to one hundred and fifty feet is possible and desired discharge rates will be obtained. However, if when the structure is assembled the tube sections are turned upside down and the ends 31 positioned toward the hopper 12, then each tube section is disposed as shown in FIG. 3. Now, the higher wall portions 45 are positioned at the bottom and the lower wall portions are positioned at the top. When so arranged, material conveyed through the tube and discharged laterally out of the openings 25 passes over the wall portion 45 instead of the wall portions 40. The angular displacement of the wall portions 45 of the holes is 3/64" which makes the tube suitable for an installation in the range of fifty to one hundred feet long. As can be seen from FIGS. 6 and 7, the angular displacement of the wall portions 45 is substantially more than that provided for the wall portions 40, the total drop from one end of tube section 16 to the other being indicated by the space 46.

Thus, if when the conveyor is assembled each tube section is mounted as shown in FIG. 2 with the end 30 toward hopper 12 and with the wall portions 40 down, then the discharge edges of the holes will be angularly displaced relative to each other 1/64". However, if each tube section is turned upside down and end for end, then the hole spacing will be 3/64".

The above design enables one tube section to have different discharge characteristics depending on whether it is mounted rightside up or upside down. It has been found that providing two step rates, namely 1/64" and 3/64", is fully adequate to take care of practically all installations.

As is conventional, the ends of the different tube sections are interconnected to provide a continuous tube. Each tube section has an end collar 50 having a radial flange 51. The flanges 51 have slots 52 through which bolts may be passed to connect the tube sections to each other. The slots 52 enable angular adjustment of one tube section relative to another, so that the first hole of any tube section can be properly set relative to the last hole of the previous section. The entire tube structure is mounted on brackets 54 which include rollers 55 whereby the tube may be angularly adjusted about its longitudinal axis using the handle 56 adjacent the hopper 12. The connection of the first tube section 16 to the hopper 12 is such that the tube can be rotated relative to the hopper using handle 56.

With the structure described, only one tube size need be manufactured. The dealer who sells the conveyors has to stock only one tube size. Thus, manufacturing, distribution and sales problems are greatly minimized. Likewise, when a user installs one of these conveyors, he can add to it or take from it without having to provide new tube sizes.

To produce holes having the desired characteristics recited above, a hole shape which is trapezoidal has been chosen, the vertical walls of each opening being parallel to each other. However, the longitudinal walls are not parallel. The incline of the lower wall portions 40 is at a sharper rate than the incline of the higher wall portions 45, FIG. 2. This provides a very simple way of achieving the objects of this invention. However, it will be apparent that other hole shapes could be readily employed just so long as the lower portions of the holes have a given increment of drop or angular displacement while the upper portions of the holes have a different increment of drop. Likewise, instead of providing two discharge edges for one hole, two separate holes could be provided at each discharge station in the same tube, one hole being used for the discharge material when the tube is rightside up and the other hole being used when the tube is upside down. Such alternative structure is shown in FIG. 8 wherein the hole 40' is equivalent to the lower wall 40 of each hole 25 and the hole 45' is equivalent to the higher wall 45 of each hole 25.

While this invention has been described in connection with a particular embodiment thereof, it will be understood that it is capable of further modifications and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention what I claim is:

1. A conveyor for forage or the like comprising a supply source, a generally horizontally extending tube communicating with said supply source and normally having a first end adjacent the supply source and a second end remote therefrom, an auger rotatable in said tube to convey material from the supply source and through the tube from said first end and toward said second end, said tube having longitudinally spaced side openings through which material is laterally discharged as it is conveyed through the tube, the lower walls of said discharge openings being spaced progressively lower from a high point adjacent said first end of the tube to a low point adjacent said second end of the tube, the higher walls of said discharge openings being spaced progressively lower from a high point adjacent said first end of said tube to a low point adjacent said second end of the tube, the progressive spacing of said lower walls being different from the progressive spacing of said higher walls, and means for selectively mounting said tube rightside up with said first end toward said supply source or upside down with second end toward the supply source.

2. A conveyor for forage or the like as recited in claim 1 wherein said lower walls of said discharge openings are inclined downwardly from a high point adjacent said supply source to a low point remote therefrom.

3. A conveyor for forage or the like as recited in claim 2 wherein said higher walls of said discharge openings are inclined downwardly from a high point adjacent said supply source to a low point remote therefrom.

4. A conveyor for forage or the like as recited in claim 3 wherein the downward inclination of said lower walls is different from the downward inclination of said higher walls.

5. A conveyor for forage or the like as recited in claim 1 wherein all of said side openings are of the same size and shape, being angularly displaced however relative to each other about the longitudinal axis of said tube.

6. A conveyor for forage or the like as recited in claim 1 wherein said side openings are trapezoidal in shape.

7. A conveyor for forage or the like as recited in claim 1 wherein the progressive spacing of said higher walls is approximately one-third the progressive spacing of said lower walls.

8. A conveyor tube adapted to extend generally horizontally and having a first end, a second end, and longitudinally spaced side openings between said ends, the lower walls of said discharge openings being spaced progressively lower from a high point adjacent said first end of the tube to a low point adjacent said second end of the tube, the higher walls of said discharge openings being spaced progressively lower from a high point adjacent said first end of said tube to a low point adjacent said second end of the tube, the progressive spacing of said lower walls being different from the progressive spacing of said higher walls.

9. A conveyor for forage or the like as recited in claim 1 wherein each of said openings has two vertically extending side walls against which material may be directed by said auger, said vertical walls facilitating the discharge of material from said tube.

References Cited in the file of this patent

UNITED STATES PATENTS

| | | |
|---|---|---|
| 126,826 | Milton | May 14, 1872 |
| 2,087,813 | Peterson | July 20, 1937 |
| 2,630,906 | Philipp | Mar. 10, 1953 |
| 2,867,314 | Hansen | Jan. 6, 1959 |